3,152,003
PROCESS FOR PRESERVING MATERIALS
Laurent Exchaquet, Geneva, Switzerland, assignor to Stephen J. Wilson, Los Angeles, Calif.
No Drawing. Filed Sept. 6, 1961, Ser. No. 136,206
12 Claims. (Cl. 117—62.2)

This invention relates to a process for treating and preserving materials, particularly flexible sheet materials such as paper, cloth maps and documents, whereby the materials are rendered substantially impervious to normally damaging fluid substances, among which is water, and the materials are rendered substantially crease- or wrinkle-free, to effect a reduction in loss and damage due to continuous use, abuse and exposure to the elements.

An object of the invention is to provide a process for treating materials such as paper and cloth and the like, whereby the materials are rendered substantially resistant to normally damaging fluids such as water, and salts dissolved in water, and normally occurring gases such as carbon dioxide, carbon monoxide, smog, and the like, which contaminate the air.

Another object of the invention is to provide a process for treating materials such as paper and cloth whereby the treated materials are rendered substantially crease- or wrinkle-free, resulting in increasing the amount of use and abuse to which the materials may be subjected, and prolonging the life of the materials.

A still further object of this invention is to provide a process for treating materials such as paper and cloth, whereby the materials may be written upon with ink, pencil, wax or grease crayon, and the marking readily removed using merely a cloth or or a cloth moistered with water and a small quantity of soap or detergent.

A yet further object of this invention is to provide a process for treating materials of the character described, whereby a clear, transparent substance is applied to the material which enables a design, inscription, writing, and the like, that is present on the material, to be readily seen.

Another object of the invention is to provide a process for treating materials of the character described, wherein the process is economical to apply, the substances used are readily available, and the process is applicable to mass production techniques and procedures.

A more specific object of this invention is to provide a process for treating flexible materials such as paper and cloth maps of all types, and paper and cloth documents of all types, with a clear coating that tenaciously adheres thereto, whereby the maps and documents are resistant to normal aging and use, are resistant to many fluids such as water and water soluble salts, and are substantially crease-resistant, which reduces the likelihood of tearing the materials along creased lines acquired from repeated folding and the like.

Other and more specific objects and advantages will appear and be brought out more fully in the following specification.

It has been determined that a solution containing a solvent for a chemically neutral carrier, a gum substance, a softening agent, and a wetting agent, when applied to a flexible material such as a paper map (which is here given as an illustration and is not to be considered a limitation) will render the paper map waterproof, substantially crease- and wrinkle-resistant, and resistant to normal aging processes. The paper map will acquire a smooth, substantially void-free surface from which inks, waxes, oils and pencil marks may be wiped free. To insure continued prolonged life for the paper map, and to prevent the loss of the substances deposited into and between the fibers of the paper, following the immersion thereof, it has been found that a fixing agent or stabilizer applied over the impregnated paper will achieve the result desired. The paper may be immersed in a bath, or it may be conveyed through the solution, or the solution may be applied by such means as spraying and the like.

Many applicable substances are available as solvents, but from the standpoint of economy and mass production procedures, water is preferred and is considered to be the most applicable. In order to achieve a complete dissolving of the substances admixed therewith and to obtain a sufficiently low viscosity whereby the solution will flow freely over and about the paper or material immersed into the solution, between about 20,000–30,000 parts by volume, and preferably 25,000 parts by volume, of water is used.

Use of a minimum quantity of water will result in an increased viscosity of the solution, with an attendant reduction in producing an even flow and distribution of the solution over the immersed material. Use of a maximum quantity of water will result in an increase in drying time and the material will have to remain immersed in the solution for a longer period to assure an adequate deposit of the substance in the solution in and between the fibers of the material.

The chemically neutral or non-reactive carrier, considered to be relatively soluble in water at room temperatures, and of course more soluble in water at elevated temperatures, is preferably gelatin, a protein comprised of a plurality of amino acids. Gelatin in the range of between about 15 to 30 parts by volume, and preferably 25 parts by volume, is admixed with the water.

A gum, with the assistance of the other substances, will impart the properties of crease- and wrinkle-resistance to the impregnated paper, and the gum found to be most applicable is India rubber, which is admixed with the water in amounts between about 0.15 to 0.30 part by volume, and preferably 0.25 part by volume. Use of the maximum quantity of gum will increase the resistance of the material to creases and wrinkles, but at the same time it will also impart the properties of increasing the resistance of the material to folding in a compact manner. The use of minimum quantities of gum will result in lowering the resistance of the material to creases and wrinkles.

The flexibility and suppleness of the paper is enhanced, and absolute drying out of the paper to a brittle state is prevented if between about 10.1 to 22.3 parts by volume, and preferably 16.5 parts by volume, of chemically pure glycerine is admixed with the water. Glycerine imparts to the paper a moisture factor which exists as long as the glycerine is present, and the use of a minimum quantity of glycerine will result in a shorter life of the paper which has a direct effect on the gum. Without the glycerine, the paper will become brittle and decompose. Use of a maximum quantity of glycerine will increase the moisture factor, but it will also directly affect the drying time required to produce a material that is usable. Also, the maximum quantity of glycerine will increase the surface tension of the solution, making it more difficult for the solution to penetrate into the material.

It is necessary to admix with the water solvent a wetting agent that will reduce the surface tension of the water, the glycerine, and the solution generally. In the absence of a wetting agent, the surface tension of the solution will resist adequate penetration of the substances dissolved therein into and between the fibers of the paper. Ordinary soaps and detergents have been found to be adequate wetting agents, but the preferred wetting agent used is benzoic acid in quantities between about 0.100 to 0.200 part by volume, and preferably 0.125 part by volume.

Following immersion of the paper in the liquid bath or solution, and before the paper is completely dry, a fixative or stabilizer is applied which tenaciously adheres thereto, and which includes a solvent and preferably an aldehyde. Again it has been found that the solvent considered to be most applicable, and the one preferred, is water, for the reason that if sufficient quantities are used, the solution may be readily applied by sprayers. Considerable latitude in the amount of solvent to be used is available, but it has been found that between about 50 to 80 parts by volume of solvent will provide the desired results, and it is preferred that 62 parts by volume be used. The less solvent used the more difficult it will be to spray the fixative, and the more solvent used the more difficult it will be to obtain an adequate deposit of the fixative on the material.

Admixed with the solvent is the aforementioned aldehyde, which preferably is formaldehyde. Between about 20 to 50 parts by volume is admixed with the water, and it is preferred that 38 parts by volume be used.

Careful consideration must be given to preparing the liquid bath in which the paper is to be immersed. The gelatin is added to finely ground India rubber and thoroughly mixed. This mixture is introduced into a preferably galvanized container and carefully stirred into the water and heated between about one to three hours, preferably two hours, at a temperature between about 30° to 38° C., and preferably 35° C., until a solution is obtained. Glycerine is added to the heated solution and between about 15 to 30 minutes, and preferably 20 minutes after the addition of the glycerine, benzoic acid, previously dissolved in between about 1.25 to 5.0 parts by volume, and preferably 2.5 parts by volume, of water, is added to the solution.

The final solution is maintained at the temperatures above recited.

Leaves or sheets of paper are immersed in the solution and frequently turned so that a thorough penetration of the substances of the solution into and between the fibers of the paper will be obtained. Following complete saturation of the sheets of paper in the solution, they are removed and placed in a drip-dry position. However, while each sheet of paper is still moist or damp, the fixative is applied thereto, preferably by spraying. After the fixative is applied and while the sheets of paper are still moist or damp, they are removed from the drip-dry position and extended on a plate where they are powdered or sprinkled with a talc, preferably French chalk, and lightly rubbed with a soft cloth.

The foregoing treatment serves to produce a coating that is substantially void-free, for the reason that the substances of the solution have thoroughly penetrated into and between the fibers of the paper, and each sheet of paper is resistant to wrinkles and creases. Also, the treated sheets of paper are resistant to the damaging effects of marks applied thereto with ink, pencils, wax and grease crayons, because, the coating being free of voids, the marking materials are incapable of penetration. Fluids, both liquids and gases, also are incapable of damaging the sheets, again for the reason that voids into which the fluids may penetrate are not present in the coating.

Although the description of this invention has been devoted primarily to paper, it is to be understood that the process is entirely applicable to cloth and other fibrous materials. Also, the fibrous materials need not necessarily be flexible; they may be rigid.

The following examples are given to illustrate the versatility of this process, and it is to be understood that the method for admixing the ingredients is identical to the method above recited.

*Example I*

| Solution: | Parts by volume |
|---|---|
| Water | 20,005.00 |
| Gelatin | 30.00 |
| India gum | 0.30 |
| Glycerine | 22.30 |
| Benzoic acid | 0.20 |
| Fixative: | |
| Water | 50 |
| Formaldehyde | 50 |

This example serves to illustrate that a minimum amount of solvent may be used in the solution and fixative, and because of this the drying time is reduced. The quantity of solvent given in this example also reflects that which is used for dissolving the benzoic acid. However, immersion of the material in the solution will have to be prolonged in order to assure an adeqaute deposit of the substances of the solution into and between the fibers of the material. The deposition of the fixative is more than adequate, but spraying of the fixative is not ideal. Therefore, in this example, applying the fixative in another manner other than spraying is probably more desirable.

*Example II*

| Solution: | Parts by volume |
|---|---|
| Water | 30,001.25 |
| Gelatin | 15.00 |
| India gum | 0.15 |
| Glycerine | 10.10 |
| Benzoic acid | 0.10 |
| Fixative: | |
| Water | 80 |
| Formaldehyde | 20 |

This example serves to show that a maximum quantity of solvent may be used in the solution and fixative with a minimum quantity of the other substances. Again the quantity of water shown reflects the quantity used to dissolve the benzoic acid. Penetration of the substances of the solution into and between the fibers of the material is complete, but the drying time is prolonged, which has a direct bearing on the economics of the process. The fixative is easily sprayed onto the material, and an acceptable coverage is obtained.

*Example III*

| Solution: | Parts by volume |
|---|---|
| Water | 25,002.500 |
| Gelatin | 25.000 |
| India gum | 0.250 |
| Glycerine | 16.500 |
| Benzoic acid | 0.125 |
| Fixative: | |
| Water | 62 |
| Formaldehyde | 38 |

The preferred quantities of the substances were used in this example, with the water reflecting also the quantiy of water used to dissolve the benzoic acid. Ideal penetration of the substances of the solution into and between the fibers of the material may be obtained, and the drying time is considered the most economical. The fixative when applied by sprayer is more evenly distributed, with an ideal coverage being obtained.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalents thereof.

What is claimed is:

1. A process for treating fibrous materials comprising: thoroughly mixing between about 15 to 30 parts by volume of gelatin with between 0.15 to 0.30 part by volume of finely ground India rubber; introducing the mixture into between about 20,000 to 30,000 parts by volume of water heated to between about 30° to 38° C.; carefully stirring the mixture in the water; continuing to heat the mixture and water at a temperature between about 30° to 38° C. until a first solution is obtained; introducing into the first solution between about 10.1 to 22.3 parts by volume of glycerine; following the introduction of glycerine and after a delay of between about 15 to 30 minutes introducing into the first solution a second solution containing between about 0.1 to 0.2 part by volume of benzoic acid; immersing said fibrous material into said first solution until saturation of the material is achieved; then removing said fibrous material from said first solution and placing in a position to drip dry; prior to complete drying of said fibrous material applying to said fibrous material a fixative solution containing between about 50 to 80 parts by volume of water and 20 to 50 parts by volume of formaldehyde, and then applying a talc to said fibrous material and lightly rubbing away excess talc.

2. A process for treating fibrous materials comprising: thoroughly mixing 25 parts by volume of gelatin with 0.25 part by volume of India rubber; introducing the mixture into 25,000 parts by volume of water heated to 35° C.; carefully stirring the mixture in the water; continuing to heat the mixture and water at a temperature of 35° C. until a first solution is achieved; introducing into the first solution 16.5 parts by volume of glycerine; following the introduction of glycerine and after a delay of 20 minutes introducing into the first solution a second solution containing 0.125 part by volume of benzoic acid; immersing said fibrous material into said first solution until saturation of the material is achieved; then removing said fibrous material from said first solution and placing it in a position to drip-dry; prior to complete drying of said fibrous material applying to said fibrous material a fixative solution containing 62 parts by volume of water and 38 parts by volume of formaldehyde, and then applying talc to said fibrous material and lightly rubbing away excess talc.

3. A process for treating a sheet of fibrous material comprising: applying to said sheet until saturated a solution containing between about 20,000 to 30,000 parts by volume of water as a solvent, between about 0.15 to 0.30 part by volume of India rubber as a crease- and wrinkle-resistant agent, between about 10.1 to 22.3 parts by volume of glycerine as a softening agent, gelatin as a carrier for said India rubber and said glycerine, and a wetting agent; removing said saturated sheet from the presence of said solution and allowing said sheet to partially dry; and applying a second solution to said partially dried sheet, said second solution including water as a solvent and formaldehyde as a fixative.

4. A process for treating a sheet of fibrous material comprising: applying to said sheet until saturated a solution containing about 20,000 to 30,000 parts by volume of water as a solvent, between about 0.15 to 0.30 part by volume of India rubber as a crease- and wrinkle-resistant agent, between about 10.1 to 22.3 parts by volume of glycerine as a softening agent, between about 15 to 30 parts by volume of gelatin as a carrier for said India rubber and said glycerine, and a wetting agent; removing said saturated sheet from the presence of said solution and allowing said sheet to partially dry; and applying a second solution to said partially dried sheet, said second solution including water as a solvent and formaldehyde as a fixative.

5. A process for treating a sheet of fibrous material comprising: applying to said sheet until saturated a solution containing between about 20,000 to 30,000 parts by volume of water as a solvent, between about 0.15 to 0.30 part by volume of Indian rubber as a crease- and wrinkle resistant agent, between about 10.1 to 22.3 parts by volume of glycerine as a softening agent, between about 15 to 30 parts by volume of gelatin as a carrier for said India rubber and said glycerine, and a wetting agent; removing said saturated sheet from the presence of said solution and allowing said sheet to partially dry; and applying a second solution to said partially dried sheet, said second solution including between about 50 to 80 parts by volume of water as a solvent and 20 to 50 parts by volume of formaldehyde as a fixative.

6. A process for treating a sheet of fibrous material comprising: applying to said sheet until saturated a solution containing between about 20,000 to 30,000 parts by volume of water as a solvent, between about 0.15 to 0.30 part by volume of Indian rubber as a crease- and wrinkle resistant agent, between about 10.1 to 22.3 parts by volume of glycerine as a softening agent, between about 15 to 30 parts by volume of gelatin as a carrier for said India rubber and said glycerine, and between about 0.1 to 0.2 part by volume of benzoic acid as a wetting agent; removing said saturated sheet from the presence of said solution and allowing said sheet to partially dry; and applying a second solution to said partially dried sheet, said second solution including between about 50 to 80 parts by volume of water as a solvent and 20 to 50 parts by volume of formaldehyde as a fixative.

7. A process for treating a sheet of fibrous material comprising: applying to said sheet until saturated a solution containing between about 0.15 to 0.30 part by volume of a gum as a crease- and wrinkle-resistant agent, between about 10.1 to 22.3 parts by volume of glycerine as a softening agent, a quantity of a chemically neutral carrier for said crease- and wrinkle-resistant agent and said softening agent, a wetting agent, and a sufficient quantity of a solvent so that said solution will have a sufficiently low viscosity to freely flow through the fibers of said sheet of material to saturate the sheet of material; removing said saturated sheet from the presence of said solution and allowing said sheet to partially dry; and applying a second solution to said partially dried sheet, said second solution including a solvent and a fixative.

8. A process for treating a sheet of fibrous material comprising: applying to said sheet until saturated a solution containing between about 20,000 to 30,000 parts by volume of water as a solvent, between about 0.15 to 0.30 part by volume of a gum as a crease- and wrinkle-resistant agent, between about 10.1 to 22.3 parts by volume of glycerine as a softening agent, a quantity of a chemically neutral carrier for said crease- and wrinkle-resistant agent and said softening agent, and a wetting agent; removing said saturated sheet from the presence of said solution and allowing said sheet to partially dry; and applying a second solution to said partially dried sheet, said second solution including a solvent and a fixative.

9. A process according to claim 8 wherein said carrier is gelatin and said first-mentioned solution contains between about 15 to 30 parts by volume of said gelatin.

10. A process according to claim 8 wherein said crease- and wrinkle-resistant agent is India rubber.

11. A process according to claim 8 wherein said fixative is formaldehyde.

12. A process according to claim 8 wherein said carrier is gelatin and said first-mentioned solution contains between about 15 to 30 parts by volume of said gelatin, wherein said crease- and wrinkle-resistant agent is India rubber, and wherein said fixative is formaldehyde.

References Cited in the file of this patent

UNITED STATES PATENTS

| | | |
|---|---|---|
| 1,957,369 | Swan | May 1, 1934 |
| 2,173,829 | Drew | Sept. 26, 1939 |